United States Patent
Qiu et al.

(10) Patent No.: US 10,187,283 B2
(45) Date of Patent: Jan. 22, 2019

(54) TESTING THE PERFORMANCE OF A LAYER 3 PROXY DEVICE USING TRAFFIC AMPLIFICATION

(71) Applicant: Telefonaktiebolaget LM Ericsson (publ), Stockholm (SE)

(72) Inventors: Kermit Qiu, Guangzhou (CN); Johan Svedberg, Stockholm (SE); Terry Yu, Guangzhou (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 272 days.

(21) Appl. No.: 15/037,607

(22) PCT Filed: Nov. 19, 2013

(86) PCT No.: PCT/CN2013/087370
§ 371 (c)(1),
(2) Date: May 18, 2016

(87) PCT Pub. No.: WO2015/074171
PCT Pub. Date: May 28, 2015

(65) Prior Publication Data
US 2016/0294657 A1     Oct. 6, 2016

(51) Int. Cl.
*G06F 15/16*    (2006.01)
*H04L 12/26*    (2006.01)
*H04L 29/08*    (2006.01)

(52) U.S. Cl.
CPC .......... *H04L 43/0888* (2013.01); *H04L 43/50* (2013.01); *H04L 67/14* (2013.01); *H04L 69/325* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 5,974,572 A | * | 10/1999 | Weinberg | G06F 11/32 707/E17.116 |
| 6,058,429 A | * | 5/2000 | Ames | H04L 49/602 370/399 |

(Continued)

FOREIGN PATENT DOCUMENTS

| CN | 1893374 A | 1/2007 |
|---|---|---|
| CN | 101883023 A | 11/2010 |

(Continued)

OTHER PUBLICATIONS

Zhang, Xiaolan et al., "AMPS: A Flexible, Scalable Proxy Testbed for Implementing Streaming Services", Proceedings of the 14th International Workshop on the Network and Operating Systems Support for Digital Audio and Video, NOSSDAV 2004, 2004, 116-121.

*Primary Examiner* — Alicia Baturay
(74) *Attorney, Agent, or Firm* — Murphy, Bilak & Homiller, PLLC (57) ABSTRACT

The invention is directed towards a method, computer program, computer program product and a traffic amplification device (30) for assisting in the testing of performance of a layer 3 proxy device (12) as well as a testing system comprising such a traffic amplification device. The traffic amplification device (30) obtains a first message ($M_1$) from at least one client devices (14) and intended for a server device (22), where the first message comprises a request for processing, sends a plurality of second messages ($M_2$) to the proxy device (12) in a number corresponding to a desired degree of traffic amplification, where each second message comprises the request for processing, receives the second messages in return from the proxy device (12), selects one of the received second messages, and forwards ($FM_1$) the request for processing of the selected second message to the (Continued)

server device (22) for being processed. It is also possible to handle responses ($M_3$) from the server device in a similar manner.

23 Claims, 6 Drawing Sheets

(56) References Cited

U.S. PATENT DOCUMENTS

| | | | | |
|---|---|---|---|---|
| 6,138,162 | A * | 10/2000 | Pistriotto | H04L 29/06 709/218 |
| 6,389,462 | B1 * | 5/2002 | Cohen | H04L 29/06 707/999.01 |
| 6,477,483 | B1 * | 11/2002 | Scarlat | G06F 11/3414 702/186 |
| 6,549,944 | B1 * | 4/2003 | Weinberg | G06F 11/32 707/E17.116 |
| 6,678,793 | B1 * | 1/2004 | Doyle | G06F 17/30902 709/226 |
| 6,804,796 | B2 * | 10/2004 | Gustaysson | G06F 11/3692 714/38.1 |
| 6,889,160 | B2 * | 5/2005 | Sabiers | G06F 11/3495 702/122 |
| 6,981,180 | B1 * | 12/2005 | Bailey | H04L 41/145 714/38.11 |
| 7,406,627 | B2 * | 7/2008 | Bailey | H04L 41/145 714/38.1 |
| 7,496,658 | B2 * | 2/2009 | Southam | H04L 43/50 702/121 |
| 7,499,996 | B1 * | 3/2009 | Buchheit | G06F 17/30902 709/203 |
| 7,526,680 | B2 * | 4/2009 | Mathew | G06F 11/3409 714/32 |
| 7,774,297 | B2 * | 8/2010 | VanRiper | G06F 21/55 707/769 |
| 7,796,603 | B1 * | 9/2010 | Bertone | H04L 65/1069 370/395.2 |
| 7,925,692 | B2 * | 4/2011 | Dunagan | G06F 11/3688 709/203 |
| 7,945,693 | B2 * | 5/2011 | Farber | G06F 9/505 709/224 |
| 8,117,601 | B2 * | 2/2012 | Owens, II | G06F 11/3688 714/35 |
| 8,249,076 | B1 * | 8/2012 | Bertone | H04L 65/1043 370/395.2 |
| 8,291,046 | B2 * | 10/2012 | Farber | G06F 9/505 709/219 |
| 8,473,613 | B2 * | 6/2013 | Farber | G06F 9/505 709/219 |
| 8,612,530 | B1 * | 12/2013 | Sapovalovs | H04L 43/50 707/602 |
| 8,699,490 | B2 * | 4/2014 | Zheng | H04L 12/2856 370/352 |
| 8,775,551 | B2 * | 7/2014 | Chen | H04L 67/02 709/203 |
| 9,009,676 | B2 * | 4/2015 | Chua | G06F 11/3414 717/127 |
| 9,032,096 | B2 * | 5/2015 | Jawahar | G06F 17/30902 709/246 |
| 9,106,451 | B2 * | 8/2015 | Smith | H04L 12/6418 |
| 9,122,789 | B1 * | 9/2015 | Massa | G06F 11/3612 |
| 9,148,304 | B2 * | 9/2015 | Smith | H04L 12/6418 |
| 9,203,931 | B1 * | 12/2015 | Ngo | H04L 67/28 |
| 9,258,209 | B2 * | 2/2016 | Janardhanan | H04L 45/04 |
| 9,374,437 | B2 * | 6/2016 | Tussing | H04L 67/2819 |
| 9,742,858 | B2 * | 8/2017 | Holland | H04L 67/2804 |
| 9,832,095 | B2 * | 11/2017 | Bott | H04L 43/0876 |
| 9,887,963 | B2 * | 2/2018 | Robertson | H04L 63/0281 |
| 9,900,233 | B2 * | 2/2018 | Baillargeon | H04L 43/0811 |
| 2005/0138426 | A1 * | 6/2005 | Styslinger | H04L 63/0281 726/4 |
| 2007/0203973 | A1 * | 8/2007 | Landauer | H04L 43/50 709/203 |
| 2008/0172575 | A1 | 7/2008 | Dunagan | |
| 2008/0198742 | A1 | 8/2008 | Kaempfer | |
| 2008/0222283 | A1 * | 9/2008 | Ertugrul | G06Q 30/02 709/224 |
| 2009/0240759 | A1 * | 9/2009 | Miyamoto | G06F 11/3419 709/201 |
| 2013/0041936 | A1 * | 2/2013 | Ohtake | H04L 67/02 709/203 |
| 2013/0173756 | A1 * | 7/2013 | Luna | H04L 43/0876 709/219 |
| 2015/0082286 | A1 * | 3/2015 | Gittelman | G06F 11/3676 717/130 |
| 2015/0195181 | A1 * | 7/2015 | Birmiwal | H04L 43/50 709/224 |

FOREIGN PATENT DOCUMENTS

| | | |
|---|---|---|
| CN | 103188116 A | 7/2013 |
| CN | 103209103 A | 7/2013 |

* cited by examiner

TESTING THE PERFORMANCE OF A LAYER 3 PROXY DEVICE USING TRAFFIC AMPLIFICATION

TECHNICAL FIELD

The invention relates to layer 3 proxy devices. More particularly, the invention relates to a method, computer program, computer program product and a traffic amplification device for assisting in the testing of performance of a layer 3 proxy device as well as to a testing system comprising such a traffic amplification device.

BACKGROUND

Layer 3 proxy devices are devices operating at the third layer of the Open Systems Interconnection (OSI) model. Such a proxy device may be used as a router or a bad balancer and is provided for distributing traffic from client devices to server devices. A proxy device thus operates as a distributing node in a communication network between Clients and Servers. All traffic from such Clients may then be forwarded to the proxy device and then distributed to the most appropriate Server. For this reason, the layer 3 proxy device needs to have a high capacity and high stability. As the volume of traffic that passes through such a proxy device is large, it thus has to be reliable.

Before such a proxy device is being put in action it thus has to be tested, which may be performed in a laboratory environment. The proxy device should furthermore receive high enough traffic volumes in order to be properly tested.

The software and hardware resources required for generating the traffic volumes is therefore a factor that is limiting to the ability in testing.

Testing is thus is expensive both in terms of the amount of devices needed as well as in the amount of processing required.

It would therefore be of interest to reduce the processing resource use, while still allowing the proxy device to be fully tested.

SUMMARY

One object of the invention is thus to reduce the processing resources required during testing of a layer 3 proxy device while still allowing the proxy device to be fully tested.

This object is according to a first aspect of the invention achieved by a traffic amplification device for assisting in the testing of performance of a layer 3 proxy device. The traffic amplification device comprises:

a client device interface for exchanging data with at least one client device, a server device interface for exchanging data with a group of server devices, at least one proxy device interface for exchanging data with the layer 3 proxy device, and an amplification control unit comprising a processor and memory.

The memory contains computer instructions executable by the processor and thereby the amplification control unit is configured to obtain, via the client device interface, a first message from at least one of the client devices, where this first message is intended for any of the server devices and comprises a request for processing, send a plurality of second messages to the proxy device in a number corresponding to a desired degree of traffic amplification, where each second message comprises the request for processing, receive the second messages in return from the proxy device, select one of the received second messages, and forward the request for processing of the selected second message to the server device for being processed.

This object is according to a second aspect also achieved by a testing system for a layer 3 proxy device and comprising a traffic amplification device. The traffic amplification device comprises a client device interface for exchanging data with at least one client device, a server device interface for exchanging data with a group of server devices, at least one proxy device interface for exchanging data with the layer 3 proxy device and an amplification control unit comprising a processor and memory.

The memory contains computer instructions executable by the processor and thereby the amplification control unit is configured to obtain, via the client device interface, a first message from at least one of the client devices, where this first message is intended for any of the server devices and comprises a request for processing, send a plurality of second messages to the proxy device in a number corresponding to a desired degree of traffic amplification, where each second message comprises the request for processing, receive the second messages in return from the proxy device, select one of the received second messages, forward the request for processing of the selected second message to the server device for being processed, obtain, via the server device interface, a third message from the server device, where this third message comprises a response to the request for processing, send a plurality of fourth messages to the proxy device in a number corresponding to a desired degree of traffic amplification, where each fourth message comprises the response, receive the fourth messages in return from the proxy device, select one of the received fourth messages, and forward the response of the selected fourth message to the client device as the response to the request for processing.

The object is according to a third aspect achieved through a method for assisting in the testing of performance of a layer 3 proxy device. The method is performed in a traffic amplification device and comprises:

obtaining a first message from at least one client device and intended for any server device in a group of server devices, where the first message comprises a request for processing, sending a plurality of second messages to the proxy device in a number corresponding to a desired degree of traffic amplification, where each second message comprises the request for processing, receiving the second messages in return from the proxy device, selecting one of the received second messages, and forwarding the request for processing of the selected second message to the server device for being processed.

The object is according to a fourth aspect achieved through a computer program for assisting in the testing of performance of a layer 3 proxy device. The computer program comprises computer program code which when run in a traffic amplification device, causes the traffic amplification device to:

obtain a first message fro mat least one client device and intended for any server device in a group of server devices, where the first message comprises a request for processing, send a plurality of second messages to the proxy device in a number corresponding to a desired degree of traffic amplification, where each second message comprises the request for processing, receive the second messages in return from the proxy device, select one of the received second messages, and forward the request for processing of the selected second message to the server device for being processed.

The object is according to a fifth aspect furthermore achieved by a computer program product for assisting in the testing of performance of a layer 3 proxy device. The computer program product is provided on a data carrier and comprises said computer program code according to the fourth aspect.

The invention according to the above-mentioned aspects has a number of advantages. Large amounts of traffic can be used in testing of the layer 3 proxy device without all the traffic actually being generated by client and server devices. The layer 3 proxy device can thus still be fully tested even if only a fraction of the traffic needed for such full testing is actually generated. The amount of traffic generating hardware and software that is needed can thereby be reduced. This in turn leads to simpler and more effective maintenance of the environment in which the testing is performed.

In an advantageous variation of the first aspect, the amplification control unit only performs a new sending of a second message to the proxy device after a previously sent second message has been returned.

In a corresponding variation of the third aspect, a new sending of a second message to the proxy device is only performed after a previously sent second message has been returned.

According to a further variation of the first aspect, the amplification control unit is configured to select a received second message for which a traffic forwarding condition is fulfilled when selecting one of the received second messages.

According to a corresponding variation of the third aspect, the selecting of a received second message comprises selecting a received second message for which a traffic forwarding condition is fulfilled.

According to yet another variation of the first aspect, the amplification control unit is further configured to provide a request counter, initiate the request counter for an initial second message, and change the request counter every time a second message is returned from the proxy device.

According to a corresponding variation of the third aspect, the method further comprising providing a request counter, initiating the request counter for an initial second message and changing the request counter every time a second message is returned form the proxy device.

The use of a request counter enables a stateless control of the traffic amplification, which makes the traffic amplification device to be robust and simple in structure.

The traffic forwarding condition may be fulfilled when the request counter has received a value corresponding to the sending of the number of second messages. This means that the request is forwarded to the server device after the last second message has been returned from the proxy device. This guarantees that the proxy device is fully tested before any request is forwarded.

According to a further variation of the first aspect, the amplification control unit is further configured to obtain a third message from the server device via the server device interface, where the third message comprises a response to the request for processing, send a plurality of fourth messages to the proxy device in a number corresponding to a desired degree of traffic amplification, where each fourth messages comprises the response, receive the fourth messages in return from the proxy device, select one of the received fourth messages and forward the response of the selected fourth message to the client device as the response to the request for processing.

According to a corresponding variation of the third aspect, the method farther comprises obtaining a third message from the server device, where the third message comprising a response to the request for processing, sending a plurality of fourth messages to the proxy device in a number corresponding to a desired degree of traffic amplification, where each fourth message comprises the response, receiving the fourth messages in return from the proxy device, selecting one of the received fourth messages, and forwarding the response of the selected fourth message to the client device as the response to the request for processing.

According to a further variation of the first aspect, control unit is further configured to only perform a new sending of a fourth message to the proxy device after a previously sent fourth message has been returned.

According to a corresponding variation of the third aspect, a new sending of a fourth message to the proxy device is only performed after a previously sent fourth message has been returned.

According to yet a further variation of the first aspect, the amplification control unit is configured to select a received fourth message for which a traffic forwarding condition is fulfilled when selecting one of the received fourth messages.

According to a corresponding variation of the third aspect, the selecting of a received fourth message comprises selecting a received fourth message for which a traffic forwarding condition is fulfilled.

According to another variation of the first aspect, the amplification control unit is configured to provide a response counter, initiate the response counter for an initial fourth message and change the response counter every time a fourth message is returned from the proxy device.

According to a corresponding variation of the third aspect, the method further comprises providing a response counter, initiating the response counter for an initial fourth message and changing the response counter every time a fourth message is returned from the proxy device.

The use of a response counter enables a stateless control of the traffic amplification, which makes the traffic amplification device to be robust and simple in structure.

Furthermore, the traffic forwarding condition may be fulfilled when the response counter has received a value corresponding to the sending of the number of fourth messages. This ensures that the response is forwarded to the client device after the last fourth message has been returned from the proxy device. This guarantees that the proxy device is fully tested before any response is forwarded.

The number of second and fourth messages may be set differently from each other. This allows a more flexible testing of the layer 3 proxy device. In some cases they may be set so that the number of second and fourth messages sent to the proxy device is the same.

According to yet another variation of the first aspect, the amplification control unit when being con figured to obtain a first message is configured to obtain a number of first messages with requests of different types, where these types use different data communication protocols representing different types of traffic. The response in a third message to a certain request sent in a first message may then be of a type corresponding to the type of first message and using the same data communication protocol.

According to a corresponding variation of the third aspect, the obtaining of a first message comprises obtaining a number of first messages with requests of different types, where these types use different data communication protocols representing different types of traffic. The data communication protocols may comprise Session Description Protocol (SDP), Transmission Control Protocol (TCP) and Internet Datagram Protocol (IDP)

The testing system may furthermore comprise the group of server devices and the one or more client device.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Layer 3 proxy devices, i.e. proxy devices that implement communication according to the third layer of the Open Systems Interconnection (OSI) model, i.e. the traffic layer of the OSI model, have the role of distributing traffic between server devices and client devices. As such they have to handle large traffic volumes as well as be reliable. A proxy device having this functionality is a load balancing device, which may be a router or a traffic distributor.

In order to know that a proxy device is reliable and able to handle large amounts of data traffic, it has to be tested before being put into operation.

For this reason the proxy device may be tested in a testing system before being placed in a live environment.

Figure 1:
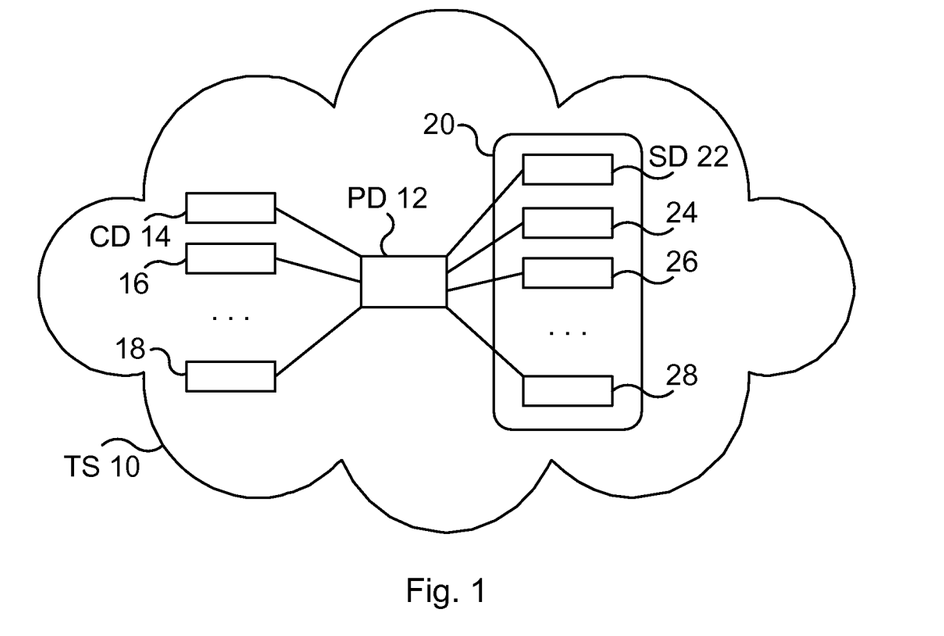
FIG. 1 schematically shows a testing system for testing a proxy device, the testing system comprising a number of client devices and a group of server devices, FIG. 2 schematically shows a rudimentary testing system where a first client device and a first server device communicate with a traffic amplification device, which in turn is communicating with the proxy device.

FIG. 1 schematically shows one such testing system TS 10, where there are a number client device CD 14, 16 18 communicating with a group 20 of server devices SD 22, 24, 26 and 28 via a layer 3 proxy device PD 12. Each client device 14, 16, 18 may implement one or more client applications set to communicate with one or more server applications. In a similar manner a server device 22, 24, 28 may implement one or more server applications. In order to test the layer 3 proxy device 12, the client devices 14, 16, 18 then generate messages that comprise requests for processing directed to corresponding server devices 22, 24, 26, 28. These messages with requests are then received by the proxy device 12, which distributes them to the server devices 22, 24, 26, 28. The server devices 22, 24, 26, 28 then perform processing according to the requests and send the results of the processing to the proxy device 12 in a number of return messages. The proxy device 12 thereafter sends the return messages to the client devices where the requests originated.

The number of requests and responses with processing results then need to be high in order to properly test the proxy device 12. There may also be requests being sent according to various traffic types. The traffic may thus have a distribution between various types of traffic, which may be a distribution according to transport protocol. This may also need to be considered in the testing.

In order to perform appropriate testing the number of client devices and the amount of processing being performed thus needs to be high. This is costly both regarding hardware, but also regarding processing. It would be of interest if this could be reduced.

It is not that simple to provide the huge amount of traffic that is needed. Software that is used for generating testing traffic is usually CPU intensive, as it takes lots of computing to shape a required data model, check errors etc. For example, if a computer acting as a client is able to generate 4 GigaByte (GB) of traffic per second as Client, and another computer acting as server is able to handle 1 GB of traffics per second as Server, then if a layer 3 proxy with the capacity of handling 40 GB is to be tested, the hardware would need to include up to 10 such computers acting as clients and up to 40 computers acting as servers for performing a throughput test of the proxy device.

From the configuration and maintenance perspective, the direct solution will involve a lot of effort because of the need to install and configure so many Clients and Servers. Furthermore, if any configuration changes are needed, these will have to be performed on all computers. Troubleshooting incase of problems will also be a long and arduous task.

There is thus a need for reducing the resources needed for testing a layer 3 proxy device. Aspects of the invention are directed towards such a resource utilisation reduction.

In order to reduce the traffic while still enabling a full testing of the layer 3 proxy device 12 to be made a traffic implication device may be provided. A traffic amplification device may be set to provide a desired degree of traffic volume increase through for instance increasing the number of requests for processing being sent to the proxy device, perhaps also together with increasing the number of responses to the requests being sent to the layer 3 proxy device. If this is done, then it is possible that the number of client devices with client applications as well as possibly also the number of server devices with server applications used for generating requests and providing responses to requests are reduced. This allows the server device to be tested with fewer resources. In this way it is possible to test a proxy device with a large amount of traffic using a limited amount of resources.

Aspects of the invention are concerned with providing such a traffic amplification device.

Figure 2:
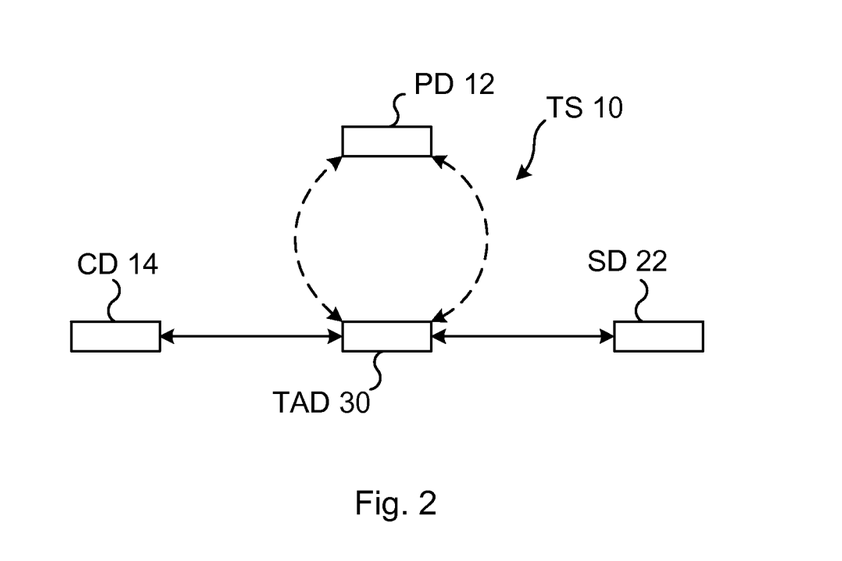

FIG. 2 schematically shows a simplified and rudimentary testing system TS 10 comprising a first client device CD 14 communicating with the traffic amplification device TAD 30, which in turn communicates with a corresponding first server device SD 22. In this example the group of server devices thus only comprises one server device. The traffic amplification device 30 also exchanges data with the layer 3 proxy device 12.

Figure 3:
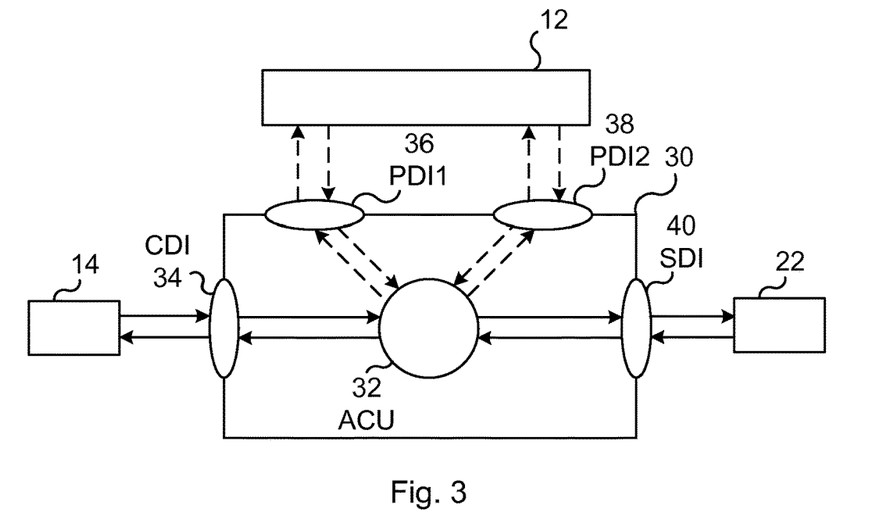
FIG. 3 shows a block schematic of one way of realizing the traffic amplification device together with the proxy device, the first client device and the first server device.

FIG. 3 shows the content of the traffic amplification device 30 in more detail together with the first client device 14, the first server device 22 and the layer 3 proxy device 12. The traffic amplification device 30 comprises a client device interlace CDI 34 via which it communicates with the client device 14. It receives requests for processing via this interface 34 and returns responses to such requests via the same interface 34. It also comprises a server device interface SDI 40, via which it forwards the requests for processing to the server device 22 and also receives the responses to these requests. The traffic amplification device 30 also comprises a first proxy device interface PDI 136 via which it sends requests for processing to the layer 3 proxy device 12 and via which it receives the sent requests in return from the proxy device 12. The traffic amplification device 30 also comprises a second proxy device interface PDI 238 via which it sends responses to requests for processing to the proxy device 12 and via which receives the same responses in return. Finally there is an amplification control unit ACU 32 in the traffic amplification device 30 connected to all these interfaces in order to control the sending of requests for processing and responses and for handling the reception of the same.

Figure 4:
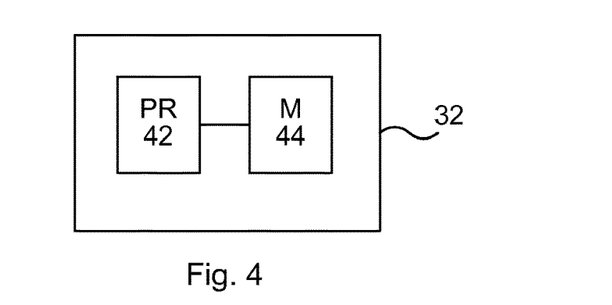
FIG. 4 shows another way of realizing the traffic amplification device, FIG. 5 schematically shows the various paths taken by messages exchanged between the first client device, the traffic amplification device, the server device and the proxy device.

FIG. 4 shows one way in which the amplification control unit 32 may be realized. It may be provided in the form of a processor PR 42 connected to a program memory M 44. The program memory 44 comprises a number of computer instructions implementing the functionality of the amplification control unit and the processor 42 implements this functionality of the amplification control unit when acting on these instructions. It can thus be seen that the combination of processor 42 and memory 44 provides the amplification control unit 32.

Figure 5:
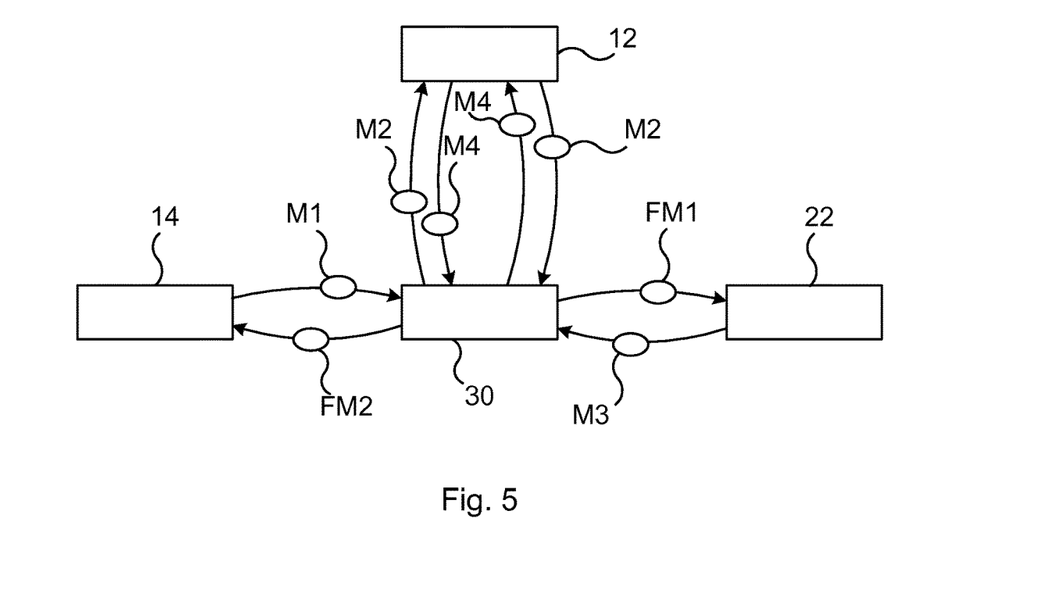

FIG. 5 schematically shows in somewhat more detail the various communication paths with messages between the client device 14, the traffic amplification device 30, the server device 22 and the layer 3 proxy device 12. The client device sends a first message M1 to the traffic 10 amplification device 32, which in turn sends a plurality of second messages M2 to the layer 3 proxy device 12 and receives the same second messages M2 in return. The traffic amplification device 30 then sends a first forwarding message FM1 to the server device 22. From the server device 22 the traffic amplification device 30 also receives a third message M3. The traffic amplification device furthermore sends a plurality of fourth messages M4 to the layer 3 proxy device 12 and receives the same fourth messages M4 in return from the layer 3 proxy device 12. Finally the traffic amplification device 30 sends a second forwarding message FM2 56 to the client device 14.

Figure 6:
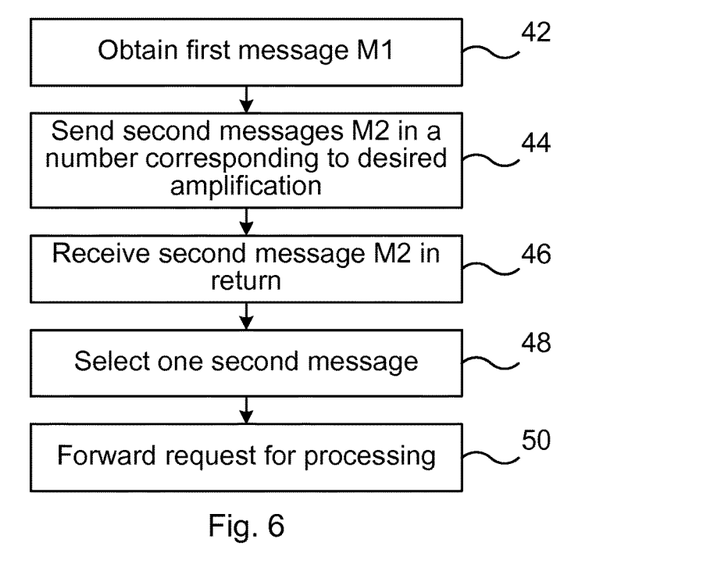
FIG. 6 shows a flow chart of method steps in a method for assisting in the testing of performance of the proxy device according to a first embodiment.

A first embodiment will now be described with reference being made to FIG. 2-5 above as well as to FIG. 6, which shows a flow chart of a number of methods steps in a method for assisting in testing of the proxy device 12.

The first embodiment will in the following be described in relation to the first client device 14 and the first server device 22. It should however be realized that there may be more client devices as well as more server devices, such as a group of server devices. These further client devices may communicate with corresponding further server devices via the traffic amplification device and proxy device 12 in the same way as was described below in relation to the first client device 14 and first server device 22.

The first client device 14 may be internally set to send all requests for processing to the traffic amplification device 30 and the first server device 22 may be internally set to send all responses to such requests to the traffic amplification device 30. In the same manner the proxy device 12 may also be set internally to receive data from the traffic amplification device 30 and return the data to the traffic amplification device 30. In this way the traffic amplification device 30 is configured as both client and server towards the layer 3 proxy device 12. As the proxy device 12 is provided for distributing traffic to a number of servers, every such server may, internally in the proxy device, be identified as the traffic amplification device. This means that whenever the proxy device 12 believes that it communicates with a server device, it is in fact communicating with the traffic amplification device 30.

What happens first in the method is that the client device 14 sends the first message M1 to the traffic amplification device 30. This first message M1 comprises a request directed to the first server device 22 to perform some kind of processing. The first message M1 thus comprises a request for processing intended for the first server device. The amplification control unit 32 of the traffic amplification device 30 receives this first message M1 via the client device interface 34 and in this way it obtains the first message M1, step 42. In this way it thus obtains a first message M1 from at least one client device, which first message M1 is addressed to one server device in a group of server devices, and in this case to the first server device 14. Another way of obtaining the first message is though the traffic amplification device fetching the first message from the client device.

After having obtained the first message M1, the amplification control unit 32 then sends a plurality of second message M2 to the proxy device 12, step 44. It furthermore sends these messages via the first proxy device interface 36 and in a number that corresponds to a desired degree of traffic amplification, which may be a desired degree of request traffic amplification. This desired degree of amplification may thus only concern requests for processing. Each second message M2 furthermore comprises the request for processing received in the first message M1. The second messages M2 may also comprise information used for keeping track of the desired degree of amplification.

If the requests are desired to be amplified x times, then x second messages M2 may be sent following a received message M1, where x is an integer. The messages may be sent sequentially. The amplification control unit 32 may thus only perform a new sending of a second message to the proxy device 12 after a previously sent second message has been returned. However, it is also possible that they are sent more or less simultaneously.

As the proxy device 12 has been set to communicate with the traffic amplification device 30, it will return all of the second messages M2 that it receives from traffic amplification device 30. This means that from the perspective of the layer 3 proxy device 12, the request of the second message M2 is originated from the traffic amplification device 30 (as client) and is to be forwarded back to the traffic amplification device 30 (as server). In the eyes of the proxy device 12, the traffic amplification device 30 is thus a client device sending a request for processing and the same traffic amplification device is the server device that is to receive the request for processing. Therefore the amplification control unit 32 receives every sent second message M2 in return from the proxy device 12, step 46, and it receives the message M2 in return via the first proxy device interface 36. Thereby it can be seen that the second messages M2 are sent in a first communication to op formed by the traffic amplification device 30 and the layer 3 proxy device 12.

The amplification control unit 32 furthermore selects one of the returned second messages M2, step 48.

If the second messages M2 are being sent sequentially, it is here possible that the specific second message being selected is an initial second message M2, i.e. a first second message M2 being sent and then received in return from the proxy device 12. It may also be a last second message M2 returned from the proxy device 12. It may also be a message in-between. It is furthermore possible to make a random selection of a returned second message M2. It is also possible to select a returned second message M2 according to the fulfillment of a traffic forwarding condition for the request. The traffic forwarding condition may be that enough second messages M2 have been sent or are in the process of being sent to the layer 3 proxy device 12 in order for the desired degree of traffic amplification to be fulfilled for the request. It may thus be that the number of second messages M2 passing in the first communication loop corresponds to the desired degree of traffic amplification. It may also be that enough second messages M2 have been safely returned from the proxy device 12. In one example the traffic forwarding condition is that enough second messages have been returned from the proxy device that the required degree of traffic amplification of the request for processing has been achieved.

In order to keep track of if enough second messages have been returned from the proxy device 12 it is possible to use a request counter. Such a request counter may be kept in the amplification control unit 32 of the traffic amplification device 30, which counter is changed, for instance incremented or decremented, for every second message M2 that is being passed in the first communication loop. The request counter may be changed for every second message M2 that is sent or every second message M2 that is detected as being returned. Alternatively such a counter may be provided in the second messages M2 themselves.

Thereafter the amplification control unit 32 forwards the request for processing contained in the selected second message M2 to the server device 22 for being processed, step 50. The request for processing may be sent in a first forwarding message FM1 via the server device interface 40. The first forwarding message FM1 may be identical to the first message M1.

It can in this way be seen that it is possible for the traffic amplification device 30 to amplify the traffic volume of the request for processing to the layer 3 proxy device 12. It is thereby possible to test the ability of the proxy device 12 to handle a multitude of requests for processing with a limited number of requests actually being created. The number of client devices used and the client device processing required for generating the requests can therefore be reduced, which lowers the resource requirements.

It is in a similar manner possible to also amplify the volume of messages with responses to such requests for processing. This is however optional. How this response amplification may be performed will now also be described with reference being made to FIG. 7, which shows a flow chart of further method steps for assisting in the testing of the performance of the proxy device 12, which steps are also performed by the amplification control unit 320 of the traffic amplification device 30.

Figure 7:
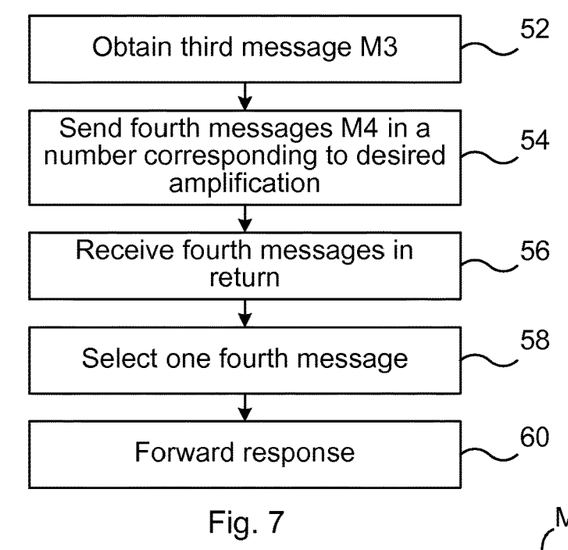
FIG. 7 shows a flow chart of further method steps for assisting in the testing of the performance of the proxy device, FIG. 8 schematically shows a message format that may be used in testing of the proxy device.

The request for processing being sent to the server device 22 will be handled and a response will be provided by the server device 22. As already mentioned above, there may be more server devices than the first server device 22. When finished with the handling of the request for processing from the first client device 14, the first server device 22 therefore sends a third message M3 with a response.

The amplification control unit 32 of the traffic amplification device 30 receives this third message M3 via the server device interface 40 and in this way it obtains the third message, step 52, where the third message M3 comprises the response of the server device 22 to the previous request and being intended for the first client device 14. Another way of obtaining the third message is through the traffic amplification device fetching the third message from the server device.

After having obtained the third message M3, the amplification control unit 32 then sends a plurality of fourth messages M4 to the proxy device 12, step 54. It furthermore sends these messages via the second proxy device interface 38 and in a number corresponding to a desired degree of traffic amplification. This degree may be a degree of response traffic amplification. This specific desired degree of amplification may thus only concern the response to the request for processing. The degree of amplification of responses may thus be different than the desired degree of amplification of requests. Each fourth message M4 furthermore comprises the response received in the third message M3. The fourth messages M4 may all be more or less identical to each other as well as to the third message M3. However, it is possible that each fourth message M4 differs somewhat from each other for example in order to keep track of the desired degree of amplification.

If the responses are desired to be amplified y times, then y fourth messages M4 are being sent, where y is an integer.

Just as the second messages M2, also these fourth messages M4 may be sent sequentially. The amplification control unit 32 may thus only perform a new sending of a fourth message to the proxy device 12 after a previously sent fourth message has been returned. However, it it is also possible that they are sent more or less simultaneously.

As mentioned above x and y may have different values. However, they may also be set to have the same value, which is sometimes desirable.

As the proxy device 12 has been set to communicate with the traffic amplification device 30, it will return all of the fourth messages M4 that it receives from traffic amplification device 30. This means that from the perspective of the layer 3 proxy device 12, the response of the fourth message M4 is originated from the traffic amplification device 30 (as server) and is to be forwarded back to the traffic amplification device 30 (as client).

The amplification control unit 32 thus receives every sent fourth message M4 in return from the proxy device, step 56, and it receives the message in return via the second proxy device interface 36. Thereby it can be seen that the fourth messages M4 are sent in a second communication loop formed by the traffic amplification device 30 and the layer 3 proxy device 12.

The amplification control unit 32 furthermore selects one of the returned fourth messages M4, step 58.

If the fourth messages M4 are being sent sequentially, it is here possible that the fourth message being selected is an initial fourth message being returned from the proxy device 12. It may also be the last fourth message returned. It may also be a message in-between. It is furthermore possible to select a message randomly. It is also possible to select a message according to the fulfilment of a traffic forwarding condition for the response to the request for processing. The traffic forwarding condition may be that enough fourth messages M4 have been sent or are in the process of being sent to the layer 3 proxy device 12 in order for the desired degree of traffic amplification to be fulfilled for the response. It may thus be that the number of fourth messages M4 passing in the second communication loop corresponds to the desired degree of traffic amplification. It may also be that enough fourth messages M4 have been safely returned from the proxy device 12. In one example the traffic forwarding condition is that enough fourth messages M4 have been returned from the proxy device 12 that the required degree of traffic amplification of the response has been achieved.

In order to keep track of if enough fourth messages have been returned from the proxy device 12, it is possible to use a response counter. Such a response counter may be kept in the amplification control unit 32 of the traffic amplification device 30, which counter is changed, for instance incremented or decremented, for every fourth message M4 that is being passed in the second communication loop. This response counter may be changed for every fourth message M4 being sent or for every fourth message M4 detected as being returned. Alternately such a counter may be provided in the fourth messages M4 themselves.

Thereafter the amplification control unit 32 forwards the response contained in the selected fourth message M4 to the client device 14, step 60. The response may be sent in a second forwarding message FM2 via the client device interface 34. The second forwarding message FM2 may be identical to the third message M3.

It can in this way be seen that it is possible to amplify the traffic volume of also the responses to the layer 3 proxy device 12. It is thereby possible to test the ability of the proxy device 12 to handle a multitude of responses with a limited number of responses actually being created. The number of server devices used and the server device processing required for generating the responses can therefore be reduced, which lowers the resource requirements.

In the first embodiment, an example was given where there is only one request for processing and one corresponding response. It should however be realized that it is possible with several more requests and possibly also responses, the number of which are being amplified for provision to the proxy device. The requests and responses may thus be of different types, which types represent different types of traffic. Different types of traffic may be provided through creating messages using different data communication protocols. The requests and corresponding responses can thus be sent according to different communication protocols. One such protocol is Session Description Protocol (SDP), another protocol is Transmission Control Protocol (TCP) and a third is Internet Datagram Protocol (IDP). The requests and responses may be provided in different percentages, reflecting various traffic type distributor. There may thus be a number of first and third messages provided according to these protocols in a relation corresponding to a traffic distribution that is to be tested. It is also possible that the traffic types may have different amplifications.

Figure 8:
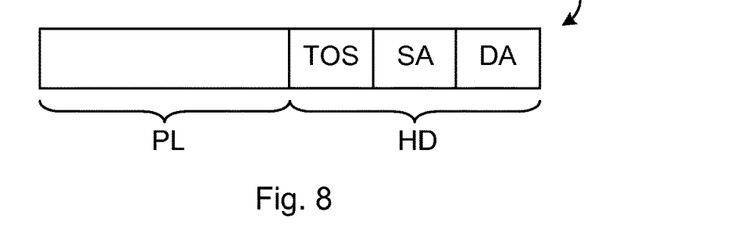
Figure 9:
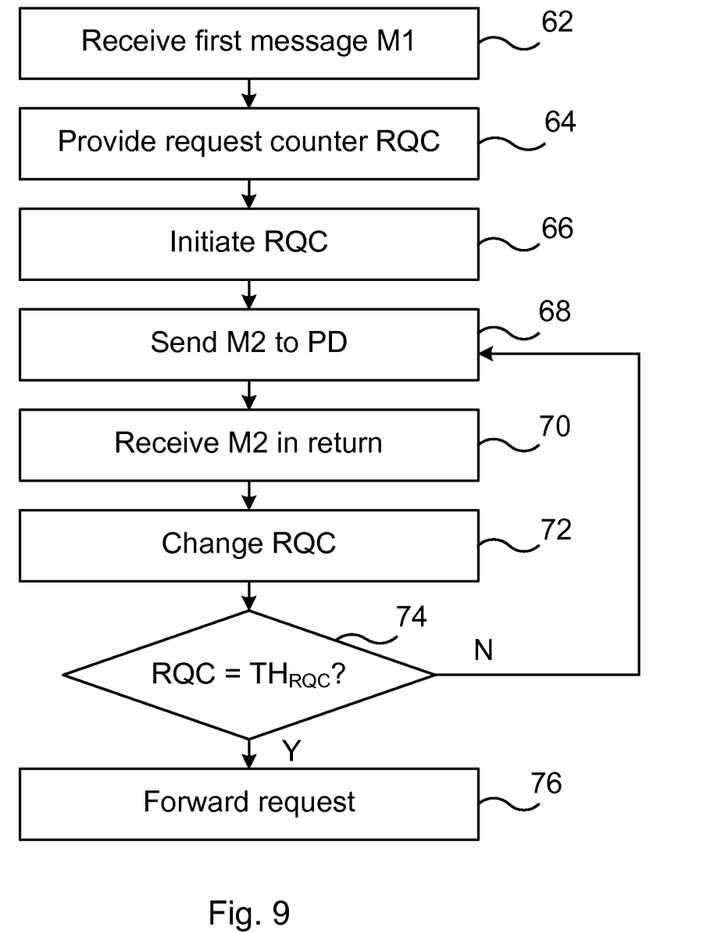
FIG. 9 shows a flow chart of a first part of a method for assisting in the testing of a proxy device according to a second embodiment.
Figure 10:
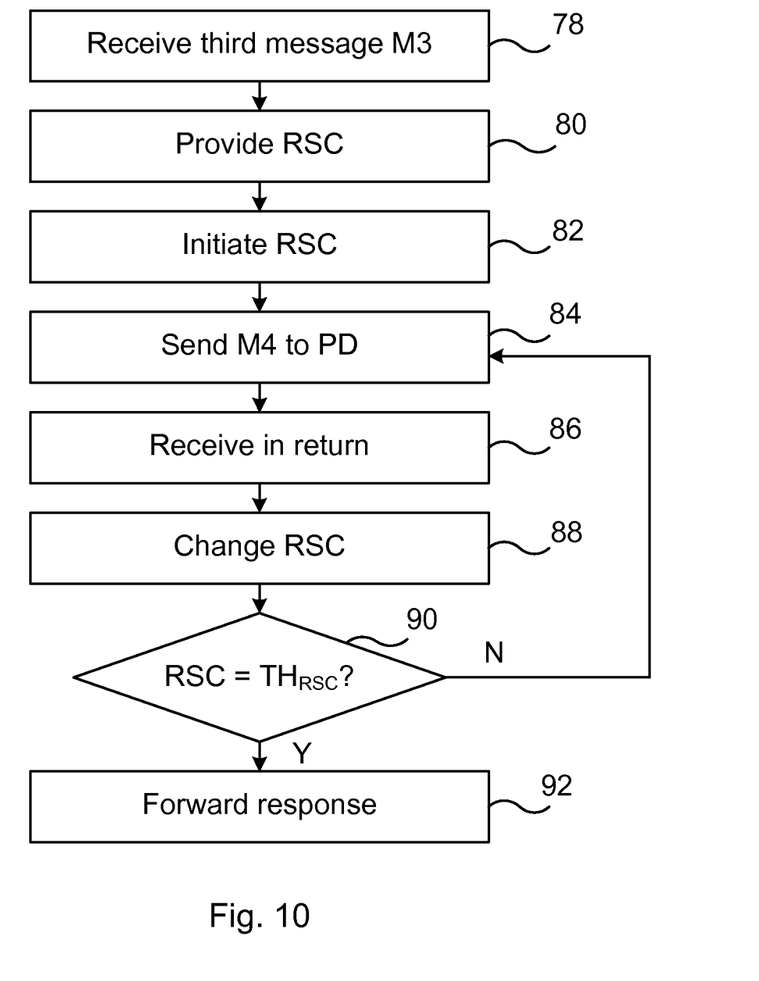
FIG. 10 shows a flowchart of a second part of the method for assisting in the testing of the proxy device according to the second embodiment, FIG. 11 schematically shows a signalling diagram with messages exchanged between the client device, the traffic amplification device, the proxy device and the server device.
Figure 11:
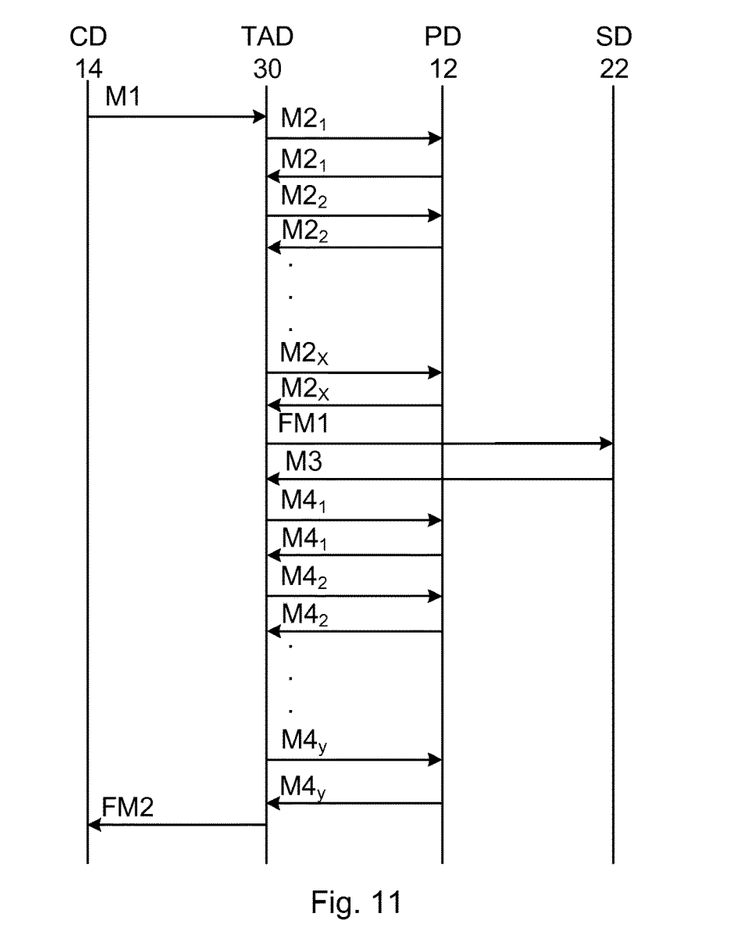

Now a second embodiment will be described with reference also being made to FIGS. 8, 9, 10 and 11, where FIG. 8 schematically shows a message format suitable for the messages, FIG. 9 shows a flowchart of a first part of a method for assisting in the testing of a proxy device, FIG. 10 shows a flow chart of a second part of the method for assisting in the testing of the proxy device and FIG. 11 schematically shows a signalling diagram with messages exchanged between the client device, the traffic amplification device, the proxy device and the server device.

FIG. 8 schematically shows the message format MF used for the data messages. Each message comprises a header HD with a destination address field DA, a source address field SA as well as a type of service field TOS. These address fields are Internet Protocol (IP) address fields and consequently the addresses are IP addresses. There may naturally be more fields, which have however been omitted in order to provide a clearer description of the second embodiment. There is also a payload PL. In such a message the source address field SA identifies the device or source where the data of the payload PL was created and the destination address field DA, the device to which the data in the payload is destined.

In this second embodiment there is a first message M1, second message M2 and a first forwarding message FM1. In these messages M1, M2 and FM1, the source address is always the address of the client device where the request is generated and the destination address the address of the server device this client device wants to process the request. In the example to be given the source address is the address of the first client device 14 and the destination address is the address of the first server device 22. The payload PL does in these messages always comprise the same request for processing.

In a similar manner there is optionally also a third message M3, fourth messages M4 and a second forwarding message FM2. In these messages M3, M4 and FM2, the source address is always the address of the server device requested to perform the processing and the destination address the address of the client device having requested the processing and for which the response is intended. In the example to be given the source address is always the address of the first server device 22 and the destination address is always the address of the first client device 14. The payload PL does in these messages always comprise the same response.

This means that even though the second and fourth messages are sent between the traffic amplification device 30 and the proxy device 12, they still have the above mentioned address settings in the destination address field DA and the source address field SA.

The TOS field may however differ between the various individual second and fourth messages in order to provide a request counter or a response counter.

As in the first embodiment, the first client device 14 sends a first message M1 comprising a request for processing intended for the first server device 22. The actual request is in this case comprised in the payload PL of the first message M1.

The first message M1 is then received by the amplification control unit 32 of the traffic amplification device 30 via the client device interface 34, step 62. The amplification control unit 32 then provides a request counter RQC, step 64. In one variation of the second embodiment this request counter is provided in a part of the amplification control unit 32 or as a counter within the traffic control device 30 and connected to the amplification control unit 32. In other variations it is provided as a part of the second messages M2. In order to provide the second messages M2 and in particular an initial second message M2, the amplification control unit 32 may copy the first message and then set one field of the header HD of the copy to act as a request counter RQC. This field is typically a field that is not used for any other purpose and in this example the TOS field is used as a request counter. It should however be realized that this field is merely one example of a field that can be used for a request counter RQC. The amplification control unit 32 then initiates the request counter RQC, step 66, which may involve setting the request counter RQC to a value x representing a desired degree of traffic amplification. If the requests are to be amplified by a factor of four, then the counter may be set to 4. As an alternative the value may be set to zero. In case the request counter is provided in a field of the initial second message M2, such as the TOS field, the counter of this field in the initial second message is set.

In order to know where to send the second messages M2 the amplification control unit 32 may investigate an internal routing table (not shown) concerning the next hop for the content of the first message M1, which routing table identifies the proxy device 12 as the destination of the next hop. Furthermore, if the first message M1 comprises a media access control (MAC) address of the client device 14, then the amplification control unit 32 may replace the MAC address of the client device 14 with a MAC address of the traffic amplification device 30 in the copy of the first message M1 used as initial second message M2.

Thereafter the initial second message M2, is sent from the amplification control unit 30 to the proxy device 12 via the first proxy device interface 36, step 68, whereupon the amplification control unit 32 waits for the reception of the initial second message in return. The payload PL of the initial second message M2, thus comprises the request for processing of the first message M1.

As the proxy device 12 is set to communicate with the traffic amplification device 30, it will return every message it receives. It will thus send the initial second message M2, in return to the traffic amplification device 33. This message M2, is furthermore typically essentially unaffected by the handling of the proxy device 12. The same message that is sent to the proxy device 12 is thus also returned essentially unchanged from the proxy device 12. The proxy device 12 may however also investigate an internal routing table concerning the next hop for the content of the initial second message M2, which routing table identifies the traffic amplification device 30 as the destination of the next hop. Furthermore, if the initial second message M2, comprises a media access control (MAC) address of the traffic amplification device 30 client device 14, then the amplification control unit 32 may replace this MAC address of the traffic amplification device 30 with an own MAC address, i.e. a MAC address of the proxy device 12.

The amplification control unit 32 thus receives the initial second message in return from the proxy device via the first proxy device interface 36, step 70, and in this way the initial second message M2, has passed one turn in the first communication loop.

Then the amplification control unit 32 changes the request counter RQC, step 72. In case the request counter had a value representing the actual desired amplification when being initiated, then the request counter RQC is decremented, while if it had a value of zero, the request counter RQC is incremented. The step size of the change may thus be a step size of one.

After having done this the amplification control unit 32 compares the request counter value with a request counter threshold $TH_{RQC}$, which has the value of zero or the value representing the desired degree of amplification depending on initial counter value. If in the example given above, the initial request counter value is 4 then the threshold setting is 0, while if the initial counter value is 0, then the three hold setting is 4. If the counter value is the same as the request counter threshold $TH_{RQC}$, step 74, this means that the second messages M2 have been passed in the first communication loop a number of times corresponding to the desired traffic volume amplification. This also means that the traffic forwarding condition is fulfilled. The reaching of the threshold $TH_{RQC}$ thereby leads to the last received second message M2, being selected. The request in the payload of the selected second message is then forwarded to the first server device 22 via the server device interface 40, step 76. The request may in this case be forwarded in a first forwarding message FM1. If the second messages M2 comprised the request counter RQC, it is possible that the field used for the request counter is changed so that it receives the same value as that used in the first message M1. As an alternative it is possible that nothing is done and mat the request counter RQC is retained in the first forwarding message. Alternatively it may be reset.

It is furthermore possible that a MAC address of the proxy device 12 is replaced by the MAC address of the traffic amplification device 33 in the first forwarding message FM1.

If however the request counter threshold $TH_{RQC}$ has not been reached, a further second message M2, is sent to the proxy device, step 68. If the header HD comprises the request counter then the request counter of this further second message M2 has the new value determined in stage 72. As before, the payload PL of the further second message M2, comprises the request for processing originally appearing in the first message M1. Also MAC address change may take place. It can also be seen that a new sending of a second message is only performed after a previously sent second message has been returned by the proxy device 12.

The amplification control unit 32 then keeps on passing second messages M2 in the first communication loop while changing the request counter RQC as long as the request counter has not reach the request counter threshold $TH_{RQC}$.

As soon as the request counter RQC reaches the request counter threshold $TH_{RQC}$ the amplification control unit 32 forwards the request to the first server device 22. Thereby the request for processing is amplified with the desired degree of amplification in order to enable a testing of the proxy device 12. Furthermore, through selecting the last second message as the request counter reaches the request counter threshold $TH_{RQC}$, it is ensured that the proxy device is fully tested before forwarding takes place.

Put differently, when incoming request from the client device 14 in the first message M1 arrives at traffic amplification device 30, the amplification control unit 32 does not immediately forward the content of the first message M1 to server device 22. Rather, the request is directed to the layer 3 proxy device 12 in the initial second message M2. Naturally, the layer 3 proxy device 12 sends the initial second message M2 with the request back to the traffic amplification device 30 after applying it's distributing function. At this point, the original request has run one round from the traffic amplification device 30, through the layer 3 proxy device 12 and then back to the traffic amplification device 30. Subsequently, the request moves on following the same way in further second messages M2, until the traffic forwarding condition is met. The traffic forwarding condition is evaluated by the amplification control unit 32, to determine when the second messages should stop running between the traffic amplification device and the layer 3 proxy device. Once the traffic forwarding condition is satisfied, the amplification control unit may stop the looping of second messages and send the request out to the actual Server device, here the first servicer device 22.

The request then reaches the first server device 22, which processes it and then provides a response, which is sent to the traffic amplifying device 30 in the payload PL of a third message M3. This may be handled in the same way as the first message M1.

The third message M3 is then received by the amplification control unit 32 of the traffic amplification device 30 via the server device interface 40, step 78. The amplification control unit 32 then provides a response counter RSC, step 80. In one variation of the second embodiment this response counter is provided in a part of the amplification control unit 32 or as a counter within the traffic control device 30 and connected to the amplification control unit 32. In other variations it is provided as a part of the fourth messages M4. In order to provide the fourth messages M4 and in particular an initial fourth message M4, the amplification control unit 32 may copy the third message and then set one field of the header HD of the copy to act as a response counter RSC. This field is also typically a field that is not used for any other purpose and with advantage the same as that which is used in the second messages, such as the TOS field. The amplification control unit 32 then initiates the response counter RSC, step 82, which may involve setting the response counter RSC to a value y representing the desired degree of traffic amplification. If the responses are to be amplified by a factor of five, then the counter may be set to 5. As an alternative the counter RSC may be set to zero. In case the request counter RSC is provided in the initial fourth message, it is set in the message itself such as in the TOS field, i.e. in the initial fourth message. It is also here possible to change MAC address according to the previously described principle.

Thereafter the initial fourth message M4, is sent from the amplification control unit 32 to the proxy device 12 via the second proxy device interface 38, step 84, whereupon the amplification control unit 32 waits for the reception of the initial fourth message in return. The payload PL of the initial fourth message M4, here comprises the response of the third message M3.

As the proxy device 12 is set to communicate with the traffic amplification device 30, it will return every message it receives to the traffic amplification device 30. It will thus send the initial fourth message M4 to the traffic amplification device 30. The payload of the message is furthermore typically unaffected by any processing performed by the proxy device 12. Essentially the same message that is sent to the proxy device 12 is thus also returned unchanged from the proxy device 12. MAC address change may however also be performed in the proxy device 12. The amplification control unit 32 thus receives the initial fourth message in return from the proxy device 12 via the second proxy device interface step 86, and in this way the initial fourth message M4, has passed one turn in the second communication loop.

Then amplification control unit 32 changes the response counter RSC, step 88. In case the counter when being initiated received a value representing the actual desired amplification, then the response counter RSC is decremented, while if it had a value of zero, the response counter RSC is incremented. The step size of the change may thus be a step size of one.

After having done this the amplification control unit 32 compares the response counter value with a response counter threshold $TH_{RSC}$, which has the value of zero or the value representing the desired degree of amplification. If in the example given above, the initial request counter value is 5 then the threshold setting is 0, while if the initial counter value is 0 then the threshold setting is 5. If the counter RSC has a value that is the same as the response counter threshold $TH_{RSC}$, step 90, the fourth messages M4 have been passed in the second communication loop a number of times corresponding to the desired traffic volume amplification. The traffic forwarding condition is thereby fulfilled. The reaching of the threshold therefore leads to the last received fourth message M4, being selected. For this reason the response in the payload PL of the recently received fourth message M4 is forwarded to the first client device 14 via the client device interface 34, step 92. The response may in this case be forwarded in a second forwarding message FM2, which may be identical to the third message M3. If the fourth messages M4 comprised the response counter RSC, it is possible that the field used for the response counter is changed back so that it receives the same value as that used in the third message M3. As an alternative it is possible that nothing is done and that the response counter value is retained in the second forwarding message. The value may also be reset.

It is also here possible to perform MAC address change in the second forwarding message FM2.

If however the response counter threshold $TH_{RSC}$ has not been reached, step 90, a further fourth message M4, is sent to the proxy device 12, step 84, the header HD comprises the response counter RSC then the response counter RSC of this further fourth message has the new value determined instep 88. The payload PL of the fourth message does as before comprise the response from the third message M3. It is also here possible mat MAC address change is performed. It can be seen that a new sending of a fourth message M4 is only performed after a previously sent fourth message has been returned by the proxy device 12.

The amplification control unit 32 then keeps on passing fourth messages M4 in the second communication loop while changing the response counter RSC as long as the response counter RSC has not reached the response counter threshold $TH_{RSC}$. As soon as the response counter RSC reaches the response counter threshold $TH_{RSC}$, the amplification control unit 32 forwards the response to the first client device 14. Thereby the response is amplified with the desired degree of amplification in order to enable a testing of the proxy device 12. This is also done without increasing the data exchanged between the client and server devices. Furthermore, through selecting the last fourth message as the response counter reaches the response counter threshold $TH_{RSC}$, it is ensured that the proxy device is fully tested before forwarding takes place.

In aspects of the invention a traffic amplification device is introduced to interface the layer 3 proxy device and Client/Server devices. The sending of second and fourth messages shapes two traffic loops, the first and the second communication loops, between the traffic amplification device and the layers proxy device so that a single traffic item that is originated from a Client and/or Server device can travel around a loop for as many times as required. From the view of the layer 3 proxy device, every looping traffic item is to be treated as new incoming traffic, while from the point of view of the Client device and Server device, only one traffic item is exchanged. In other words, the traffic is amplified when it goes through the traffic amplification device.

In this way it is possible to obtain a simple traffic amplification device for generating large amount of traffic. Some of the advantages are as the following:

Less hardware and software cost

Less maintenance cost

Higher performance and stability

Furthermore, if there is a distribution of various types of traffic among a number of first messages, these traffic types may all be amplified to the same scale. Therefore an original traffic model outlining the distribution between different types of traffic, may be preserved after amplification i.e. the traffic amplification device keeps the traffic distribution of the original model.

The traffic forwarding condition was in the second embodiment fulfilled when the last second message was returned, which provides a guarantee that the testing of the proxy device with regard to the request for processing is safely completed. It is as an alternative possible that the condition is fulfilled when the initial second message is sent. In this case the condition is fulfilled when the testing with regard to request for processing is started, which has the advantage of providing a faster testing. It is also possible to have the condition fulfilled at a number in-between the initial and last second messages. The same variations are of course also possible with regard to the testing of the responses.

If the counters are provided in the second and/or fourth messages further advantages are obtained, then there is no need to store any message or connection specific information in the traffic amplification device. The traffic amplification device is therefore in this case also completely stateless, which further enhances the performance and stability.

The interfaces of the traffic amplification device may be regular interfaces for communication according to layer 3 of the OSI model.

The amplification control unit of the traffic amplification device may, as was mentioned initially, be provided in the form of one or more processors with associated program memories comprising computer program code with computer program instructions executable by the processor for performing the functionality of the amplification control unit. Optionally the traffic amplification device may also comprise data stores that can be used for storing the above-mentioned states.

Figure 12:
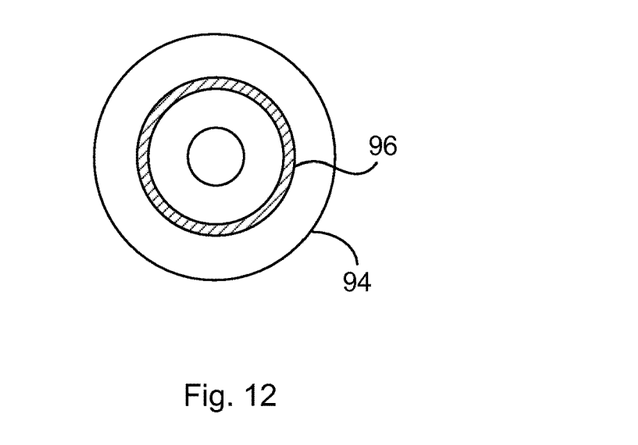
FIG. 12 shows a computer program product comprising a data carrier with computer program code for implementing the traffic amplification device.

The computer program code of a traffic amplification device may also be in the form of computer program for instance on a data carrier, such as a CD ROM disc or a memory stick. In this case the data carrier carries a computer program with the computer program code, which will implement the functionality of the above-described amplification control unit. One such data carrier 94 with computer program code 96 is schematically shown in FIG. 12.

Furthermore the amplification control unit of the traffic amplification device may be considered to comprise means for obtaining, via the client device interface, a first message from at least one client device and intended for any of server device in the group of server devices, where the first message comprises a request for processing, means for sending a plurality of second messages to the proxy device in a number corresponding to a desired degree of traffic amplification, where each second message comprises the request for processing, means for receiving the second messages in return from the proxy device, means for selecting one of the received second messages, and means for forwarding the request for processing of the selected second message to the server device for being processed.

The means for sending a plurality of second messages may be considered to comprise means for only performing a new sending of a second message to the proxy device after a previously sent second message has been returned.

The means for selecting one of the received second messages may comprise means for only selecting a received second message for which a traffic forwarding condition is fulfilled.

The amplification control unit may further be considered to comprise means for providing a request counter, means for initiating the request counter for an initial second message, and means for changing the request counter for following second messages.

The amplification control unit may further be considered to comprise means for obtaining a third message from the server device, where the third message comprises a response to the request for processing, means for sending a plurality of fourth messages to the proxy device in a number corresponding to a desired degree of traffic amplification, where each fourth message comprises the response, means for receiving the fourth messages in return from the proxy device, means for selecting one of the received fourth messages and means for forwarding the response of the selected fourth message to the client device as the response to the request for processing.

The means for sending a plurality of fourth messages may be considered to comprise means for only performing a new sending of a fourth message to the proxy device after a previously sent fourth message has been returned.

The means for selecting one of the received fourth messages may comprise means for selecting a received fourth message for which a traffic forwarding condition is fulfilled.

The amplification control unit may further be considered to comprise means for providing a response counter, means for initiating the response counter for an initial fourth message and means for changing the response counter for following fourth messages.

The means for obtaining a first message may comprise means for obtaining a number of first messages with requests of different types, where the types use different data communication protocols representing different types of traffic.

While the invention has been described in connection with what is presently considered to be most practical and preferred embodiments, it is to be understood that the invention is not to be limited to the disclosed embodiments, but on the contrary, is intended to cover various modifications and equivalent arrangements.

It is for instance possible that only one proxy device interface is used instead of two.

Therefore the invention is only to be limited by the following claims.

The invention claimed is:

1. A traffic amplification device for assisting in the testing of performance of a layer 3 proxy device, the traffic amplification device comprising:
   a client device interface for exchanging data with at least one client device,
   a server device interface for exchanging data with a group of server devices,
   at least one proxy device interface for exchanging data with the layer 3 proxy device, and
   an amplification control unit comprising a processor and memory, said memory containing computer instructions executable by said processor whereby said amplification control unit is operative to:
      obtain, via the client device interface, a first message from at least one of said at least one client devices and intended for any of said server devices, said first message comprising a request for processing,
      send a plurality of second messages to the proxy device in a number corresponding to a desired degree of traffic amplification, each second message comprising said request for processing,
      receive said second messages in return from the proxy device,
      select one of the received second messages, and
      forward the request for processing of the selected second message to the server device for being processed:,
   wherein the amplification control unit when selecting one of the received second messages is operative to select a received second message for which a traffic forwarding condition is fulfilled.

2. The traffic amplification device according to claim 1, the amplification control unit being operative to only perform a new sending of a second message to the proxy device after a previously sent second message has been returned.

3. The traffic amplification device according to claim 1, wherein the amplification control unit is further operative to provide a request counter, initiate the request counter for an initial second message, and change the request counter every time a second message is returned form the proxy device.

4. The traffic amplification device according to claim 3, wherein the traffic forwarding condition is fulfilled when the request counter has received a value corresponding to the sending of said number of second messages.

5. The traffic amplification device according to claim 1, the amplification control unit being further operative to obtain a third message from the server device via the server device interface, said third message comprising a response from the server device, send a plurality of fourth messages to the proxy device, in a number corresponding to a desired degree of traffic amplification, each fourth messages comprising said response, receive said fourth messages in return from the proxy device, select one of the received fourth messages and forward the response of the selected fourth message to the client device as the response to the request for processing.

6. The traffic amplification device according to claim 5, the amplification control unit being further operative to only perform a new sending of a fourth message to the proxy device after a previously sent fourth message has been returned.

7. The traffic amplification device according to claim 5, wherein the amplification control unit when selecting one of the received fourth messages is operative to select a received fourth message for which a traffic forwarding condition is fulfilled.

8. The traffic amplification device according to claim 7, wherein the amplification control unit is further operative to provide a response counter, initiate the response counter for an initial fourth message and change the response counter every time a fourth message is returned from the proxy device.

9. The traffic amplification device according to claim 8, wherein the traffic forwarding condition for selecting a received fourth message is fulfilled when the response counter has received a value corresponding to the sending of said number of fourth messages.

10. The traffic amplification device according to claim 5, wherein the number of second and fourth messages sent to the proxy device is the same.

11. The traffic amplification device according to claim 1, wherein the amplification control unit when being configured to obtain a first message is configured to obtain a number of first messages with requests of different types, said types using different data communication protocols representing different types of traffic.

12. The traffic amplification device according to claim 1 wherein the proxy device is a load balancing device.

13. A testing system for a layer 3 proxy device and comprising a traffic amplification device, the traffic amplification device comprising:
   a client device interface for exchanging data with at least one client device,
   a server device interface for exchanging data with a group of server devices,
   at least one proxy device interface for exchanging data with the layer 3 proxy device, and
   an amplification control unit comprising a processor and memory, said memory containing computer instructions executable by said processor whereby said amplification control unit is operative to:
      obtain, via the client device interface, a first message from at least one of said at least one client devices and intended for any of said server devices, said first message comprising a request for processing,
      send a plurality of second messages to the proxy device in a number corresponding to a desired degree of traffic amplification, each second message comprising said request for processing,
      receive said second messages in return from the proxy device,
      select one of the received second messages,
      forward the request for processing of the selected second message to the server device for being processed,
      obtain, via the server device interface, a third message from the server device, said third message comprising a processing result of the server device,
      send a plurality of fourth messages to the proxy device in a number corresponding to a desired degree of traffic amplification, each fourth message comprising a response to the request for processing, receive said fourth messages in return from the proxy device, select one of the received fourth messages, and forward the response of the selected fourth message to the client device as the response to the request for processing.

14. The testing system according to claim 13, further comprising the group of server devices and the one or more client device.

15. A method for assisting in the testing of performance of a layer 3 proxy device, the method being performed in a traffic amplification device and comprising:

obtaining a first message from at least one client device and intended for any server device in a group of server devices, said first message comprising a request for processing, sending a plurality of second messages to the proxy device in a number corresponding to a desired degree of traffic amplification, each second message comprising said request for processing, receiving said second messages in return from the proxy device, selecting one of the received second messages, and forwarding the request for processing of the selected second message to the server device for being processed;

wherein the selecting of a received second message comprises selecting a received second message for which a traffic forwarding condition is fulfilled.

16. The method according to claim 15, further comprising only performing a new sending of a second message to the proxy device after a previously sent second message has been returned.

17. The method according to claim 15, further comprising providing a request counter, initiating the request counter for an initial second message and changing the request counter every time a second message is returned from the proxy device.

18. The method according to claim 17, wherein the traffic forwarding condition is fulfilled when the request counter has received a value corresponding to the sending of said number of second messages.

19. The method according to claim 15, further comprising obtaining a third message from the server device, said third message comprising a response to the request for processing, sending a plurality of fourth messages to the proxy device in a number corresponding to a desired degree of traffic amplification, each fourth message comprising said response, receiving said fourth messages in return from the proxy device, selecting one of the received fourth messages, and forwarding the response of the selected fourth message to the client device as the response to the request for processing.

20. The method according to claim 19, where a new sending of a fourth message to the proxy device after a previously sent fourth message has been returned.

21. The method according to claim 19, wherein the selecting of a received fourth message comprises selecting a received fourth message for which a traffic forwarding condition is fulfilled.

22. The method according to claim 19, further comprising providing a response counter, initiating the response counter for an initial fourth message and changing the response counter every time a fourth message is returned from the proxy device.

23. The method according to claim 22, wherein the traffic forwarding condition for selecting a received fourth message is fulfilled when the response counter has received a value corresponding to the sending of said number of fourth messages.

* * * * *